(12) United States Patent
Roy et al.

(10) Patent No.: US 7,747,364 B2
(45) Date of Patent: Jun. 29, 2010

(54) METHODS, APPARATUS AND SYSTEMS FOR ENHANCED SYNTHETIC VISION AND MULTI-SENSOR DATA FUSION TO IMPROVE OPERATIONAL CAPABILITIES OF UNMANNED AERIAL VEHICLES

(75) Inventors: Philippe Roy, North Andover, MA (US); Jun Yu, Winchester, MA (US); David S. Linden, Dexter, MI (US)

(73) Assignee: Honeywell International Inc., Morristown, NJ (US)

( * ) Notice: Subject to any disclaimer, the term of this patent is extended or adjusted under 35 U.S.C. 154(b) by 378 days.

(21) Appl. No.: 11/951,920

(22) Filed: Dec. 6, 2007

(65) Prior Publication Data

US 2008/0215204 A1 Sep. 4, 2008

Related U.S. Application Data

(60) Provisional application No. 60/868,784, filed on Dec. 6, 2006, provisional application No. 60/916,554, filed on May 7, 2007.

(51) Int. Cl.
*G05D 1/00* (2006.01)

(52) U.S. Cl. ............................. 701/28; 701/33; 701/36; 244/158.1

(58) Field of Classification Search .................. 701/16, 701/28, 29, 33, 35, 36; 244/75.1, 158.1
See application file for complete search history.

(56) References Cited

U.S. PATENT DOCUMENTS

| 5,438,517 | A | * | 8/1995 | Sennott et al. ............... 701/213 |
| 5,933,120 | A |   | 8/1999 | Manasson et al. |
| 7,131,136 | B2 |  | 10/2006 | Monroe |
| 2007/0005199 | A1 | * | 1/2007 | He ............................. 701/16 |

OTHER PUBLICATIONS

PCT Search Report, PCT/US2007/086654 dated Oct. 2, 2008.

* cited by examiner

*Primary Examiner*—Gertrude Arthur Jeanglaud
(74) *Attorney, Agent, or Firm*—Ingrassia Fisher & Lorenz, P.C.

(57) ABSTRACT

The invention provides, in some aspects, improved methods, apparatus and systems for unmanned aerial vehicle (UAV) operation that utilize multiple data links between a UAV and a control station in order to transmit control and actionable intelligence data. Such methods, apparatus and systems can be used, for example, to monitor a selected environment (e.g., an oil field or other terrain/environment of interest). In a related aspect, such data links comprise satellite communication channels.

54 Claims, 13 Drawing Sheets

METHODS, APPARATUS AND SYSTEMS FOR ENHANCED SYNTHETIC VISION AND MULTI-SENSOR DATA FUSION TO IMPROVE OPERATIONAL CAPABILITIES OF UNMANNED AERIAL VEHICLES

This application is related to, and claims the benefit of filing, of U.S. Provisional Patent Application Ser. No. 60/868,784, filed Dec. 6, 2006, entitled "Airborne Component Integration Processor and System," U.S. Provisional Patent Application Ser. No. 60/916,554, filed May 7, 2007, entitled "Methods, Apparatus and Systems for Enhanced Synthetic Vision Systems and Multi-Sensor Data Fusion to Improve Operational Capabilities of Unmanned Aerial Vehicles," the teachings of both of which are incorporated herein by reference.

BACKGROUND OF THE INVENTION

Unmanned aerial vehicles (UAVs) have demonstrated great potential for various surveillance and reconnaissance military applications due to their growing capabilities and lower cost of operation. However, there are a number of technical constraints hindering their widespread acceptance. These include issues associated with operational effectiveness, use of data, and National Airspace access, to name a few.

Thus, for example, small UAVs have substantially reduced the cost of Line Of Sight (LOS) surveillance and reconnaissance missions, but still have difficulties integrating data-link bandwidth limitations, Beyond Line Of Sight (BLOS), traffic detection and avoidance, as well as more airborne intelligence with navigation capabilities. Most or all of these issues have not really been resolved with either reliable and/or affordable technology.

An object of the invention is to provide improved methods, apparatus and systems for unmanned aerial vehicle operation. A related object is to provide such improved methods, apparatus and systems as can be used with small UAVs.

Still further objects of the invention provide such improved methods, apparatus and systems as improve small UAVs' mission capabilities, as well as their provision of actionable intelligence.

SUMMARY OF THE INVENTION

The foregoing are among the objects attained by the invention which provides, in some aspects, improved methods, apparatus and systems for unmanned aerial vehicle (UAV) operation that utilize multiple data links between a UAV and a control station in order to transmit control and actionable intelligence data. Such methods, apparatus and systems can be used, for example, to monitor a selected environment (e.g., an oil field or other terrain/environment of interest). In a related aspect, such data links comprise satellite communication channels.

Related aspects of the invention provide such methods, apparatus and systems that use a first of the data links (e.g., satellite communication channel) for transmission of command, control and/or system monitoring data. A second one of those data links can be used for transmission of actionable intelligence data.

Further aspects of the invention provide improved methods, apparatus and systems for UAV operation, e.g., as described above, wherein the UAV includes an onboard transceiver (e.g., low-orbit satellite modem) that transmits to the control station the aforementioned command, control, system monitoring, and/or actionable intelligence data.

Further aspects of the invention provide improved methods, apparatus and systems for UAV operation, e.g., as described above, wherein the UAV includes an airborne imaging computer that acquires and/or analyzes images from onboard cameras (and other sensors). In a related aspect, the airborne imaging computer identifies actionable intelligence data, e.g., via anomaly detection.

Further aspects of the invention provide improved methods, apparatus and systems for UAV operation, e.g., as described above, wherein the imaging computer discerns coordinates of the detected anomalies and/or other actionable intelligence.

Further aspects of the invention provide improved methods, apparatus and systems for UAV operation, e.g., as described above, wherein the imaging computer effects transmission of actionable intelligence data and the coordinates to the control station. In a related aspect of the invention, such actionable intelligence data can include images, e.g., video and/or stills, acquired by the UAV's onboard sensors. In a further related aspect of the invention, such actionable intelligence data can include portions of video and/or still images representing anomalies in a terrain/environment in a vicinity of the UAV.

Further aspects of the invention provide improved methods, apparatus and systems for UAV operation, e.g., as described above, wherein the imaging computer (or other component of the UAV) transmits coordinate data to the control station over the aforementioned first data link, and images comprising the actionable intelligence data over the aforementioned second data link.

Further aspects of the invention provide improved methods, apparatus and systems for UAV operation, e.g., as described above, that includes functionality for detecting anomalies in the images and/or other sensor data.

Further aspects of the invention provide improved methods, apparatus and system for UAV operation, e.g., as described above, wherein the control station includes a synthetic vision display system that enhances a synthetic display of terrain over which the UAV is flying and/or in which an anomaly is detected with image and/or coordinate data received from the UAV. This can be used, for example, to (i) eliminate the necessity of transmitting to the control station a high-bandwidth and/or real-time stream of images representing, e.g., the terrain/environment in a vicinity of the UAV, in favor of only selected events detected in that vicinity, and (ii) focus a control station operator's attention when an actionable intelligence event occurs.

Further aspects of the invention provide improved methods, apparatus and system for UAV operation, e.g., as described above, wherein the synthetic vision display system includes a terrain database for rendering a synthetic image based on a location of the UAV (e.g., as indicated via GPS coordinates transmitted over one or more of the data links).

Further aspects of the invention are evident in the drawings and the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
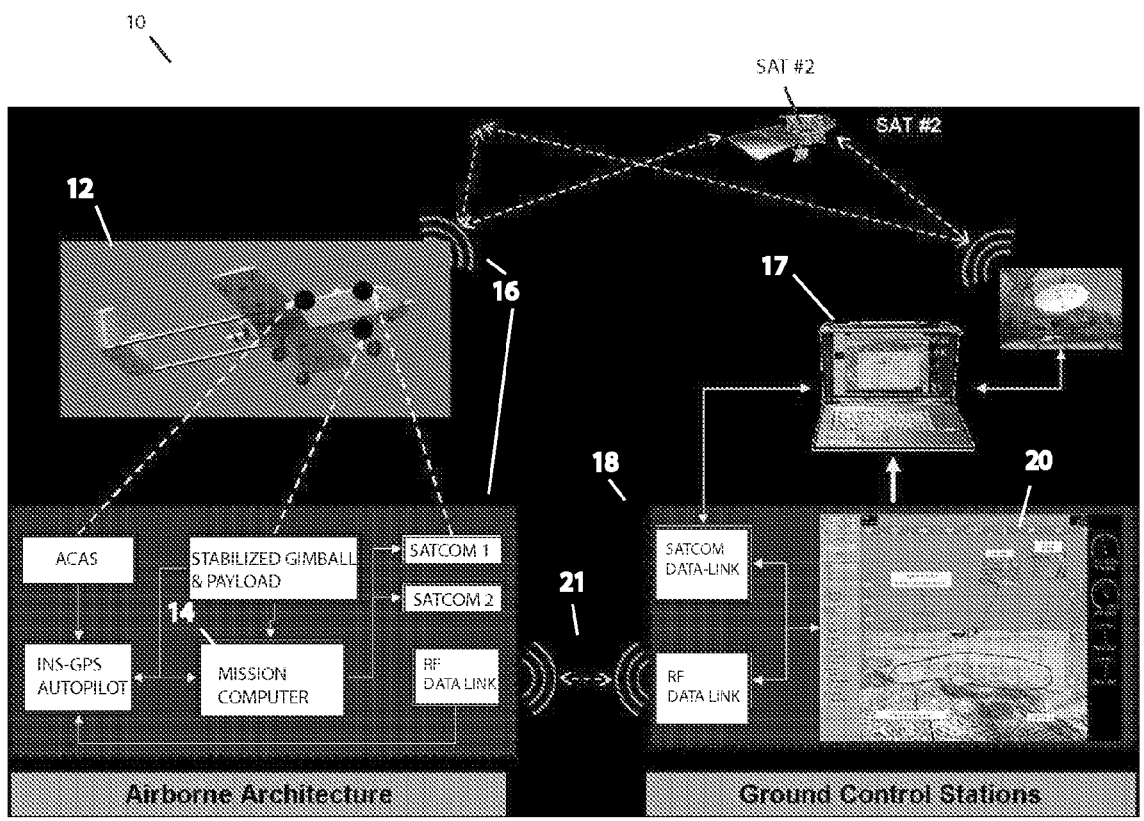
FIG. 1 depicts an autonomous small unmanned vehicle system (SUAS) according to one practice of the invention.

FIG. 1 depicts an autonomous small unmanned vehicle system (SUAS) according to one practice of the invention suitable for remote inspection, surveillance, reconnaissance and other applications (collectively, "surveillance"). The illustrated system 10 comprises the following integrated elements, though, it will be appreciated that other embodiments may include other elements, instead or in addition, and/or may include subsets of those shown below:

1. A small unmanned aircraft 12 capable of autonomous flight and equipped with an airborne video camera.
2. An airborne computer 14 that is capable of acquiring, compressing, storing and processing analog and digital video.
3. Anomaly detection software executing on computer 14.
4. Airborne low-orbit satellite modem(s) 16.
5. A ground control station 18 connected via satellite with software capable of visualizing navigation and payload data as an overlay to three dimensional terrain display 20.

The Unmanned Aircraft

Unmanned aircraft 12 (alternatively, referred to as the "UAV") may be of the type commonly known for use in SUAS systems (e.g., by way of non-limiting example, the Vector P UAV available from Intellitech Microsystems). Though craft 12 utilized in the illustrated embodiment is small of size (relative to manned aircraft), other embodiments may utilize larger craft, while other embodiments may utilize craft even smaller than that depicted in the drawings. Moreover, although illustrated craft 12 is unmanned (i.e., does not have an onboard human pilot), in other embodiments such a pilot and/or personnel other may be onboard. Still further, although illustrated craft 12 is an aircraft, it will be appreciated that in other embodiments, craft 12 may operate in other environments, e.g., water, land, and so forth. Yet still further, while illustrated craft 12 is intended for operation remote from the ground control station, in other embodiments the craft 12 may be used for nearby operations—albeit, for example, operations in which it is less preferable to expose ground control station operators and/or their equipment). For sake of simplicity, both remote and nearby operations are referred to herein as "remote."

Figure 2:
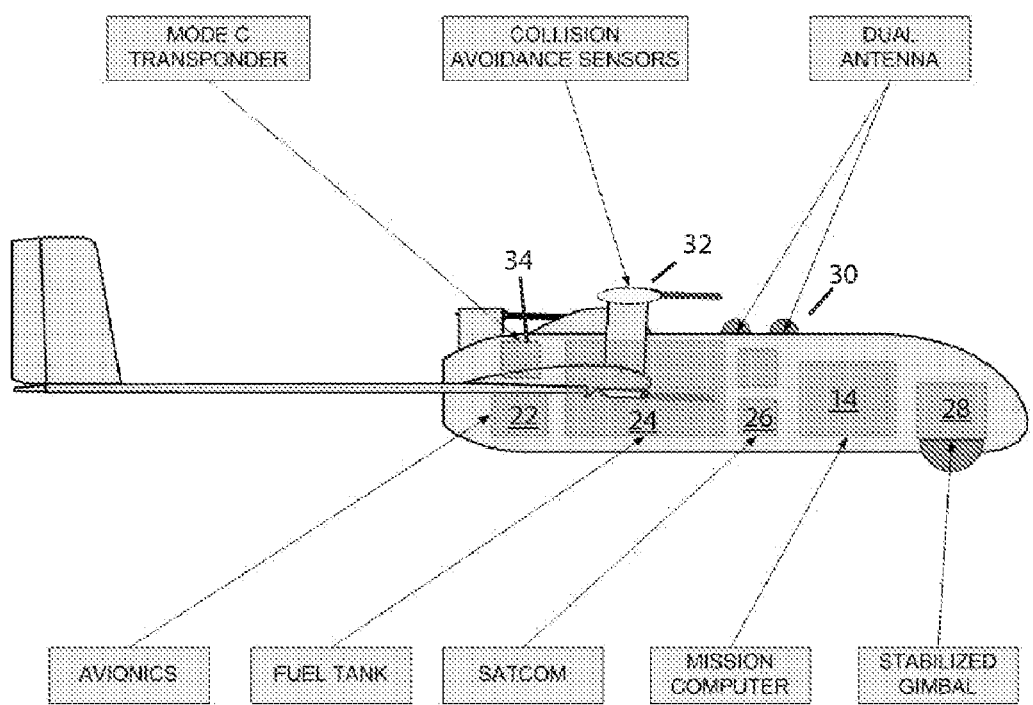
FIG. 2 depicts further details of an exemplary aircraft of the type used in one practice of the invention.

FIG. 2 depicts further details of an exemplary aircraft 12 of the type used in one practice of the invention. As shown in the drawing, illustrated craft 12 includes avionics section 22, fuel tank 24, satellite communications subsystem 26, stabilized gimbal assembly 28, satellite antenna structure 30, collision avoidance sensors 32 and mode C transponder 34, all of the type known in the art as adapted in accord with the teachings hereof. Thus, for example, antenna structure 30 of the illustrated embodiment comprises dual antennae, capable of supporting dual low-orbit (or other) satellite communications (e.g., with one antenna supporting the communication of command & control information, and the other antenna supporting communication of alarms and related data). In order to conserve space and power, the individual antenna used in the illustrated embodiment are "small" disk-shaped antenna having diameters of approximately 3" or less. Other embodiments may vary in this regard, e.g., utilizing antenna of diameters of 4" or less, 5" or less, 10" or less, and so forth. As noted above, other embodiments of the invention may include elements other than those shown in FIG. 2, instead or in addition, and/or may include subsets of those shown in the drawing.

Aircraft 12 additionally includes mission computer 14, as shown, which can comprises a portable computer or other digital data processor of the type commercially available in the marketplace as programmed and otherwise adapted in accord with the teachings hereof. Preferred such computers are ruggedized for tolerance of inflight conditions and include graphics cards to facilitate anomaly detection and other processing functions described herein.

Figure 3:
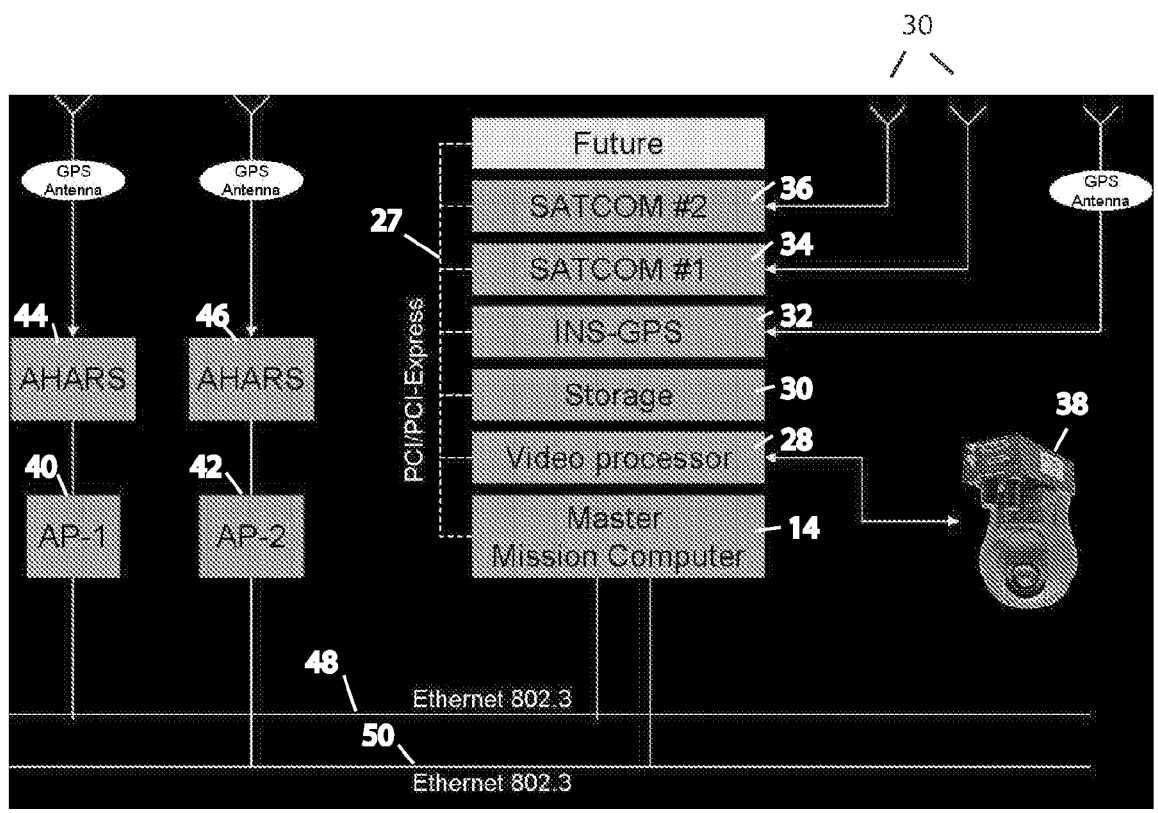
FIG. 3 depicts in further detail the interrelationships among selected ones of the aircraft-based elements shown in FIG. 1.

FIG. 3 depicts in further detail the interrelationships among selected ones of the aircraft-based elements shown in FIG. 1. Particularly, as shown in FIG. 3, mission computer 14 is coupled by way of a bus 27 to video processor 28, storage unit 30, inertial navigation system (INS)—global positioning system (GPS) system 32, and dual satellite communications modems 34, 36. Elements 28-36 are of the respective types known in the art, as adapted in accord with the teachings hereof. Thus, again, for example, although the prior art typically provides a single SATCOM modem, the illustrated embodiment utilizes two such modems 34, 36 (each supporting low-speed communications, e.g., at a rate of approximately 9600 bps—as discussed elsewhere herein), e.g., one supporting the transfer of command & control information with the GCS and the other supporting the transfer of alarms, alarm images and related data with the GCS. By way of further example, storage unit 30 may comprise an on-board disk drive that stores a video stream of the entire flight which can then be post-processed using change-detection to identify possible threats that were too subtle to detect in real time.

Bus 27 of the illustrated embodiment is a PCI/PCI-Express bus, though, in other embodiments, other bus types or communication media may be used, instead or in addition.

With further reference to the drawing, INS-GPS unit 32 is coupled to a GPS antenna, as shown. In addition, mission computer 14 is coupled to airborne video camera 38 (or other image acquisition device) by way of video processor 28. The video camera 38, which is disposed on or otherwise coupled to craft 12, acquires images of terrain, airspace, or other scenes in a vicinity of the craft 12 (and, more particularly, in a field of view of the camera 38) suitable processing by the mission computer 14 and/or transmission to the GCS 18). Video camera 38 may be of the type commonly used in airborne or other remote image acquisition (and, preferably, video image acquisition) applications and, particularly, of the type that generates a "true color" three-band (RGB) image. Video processor 28 may be of the type commonly used for interfacing a video (or other) image acquisition device with a computer for purposes of control and data transfer. Coupling between the video processor 28 and the video camera 38 may be via FireWire or other interface (wired, wireless or otherwise) known in the art.

Mission computer 14 is also coupled with autopilot systems 40, 42 (each of the type known in the art) which, themselves, are coupled to airborne heading-attitude reference systems (AHARS) 44, 46 and GPS antenna, as shown. In the illustrated embodiment, communications between the mission computer 14 and the autopilot systems 40, 42 is supported by dual ethernet channels 48, 50, though, in other embodiments, other media may provide such support.

Although in the illustrated embodiment, mission computer 14, video processor 28 and video camera 38 are disposed on craft 12 and in wired communications with one another, in other embodiments one or more of those elements be disposed elsewhere. Thus, for example, camera 38 may be disposed on craft 12, while mission computer 14 and video processor 28 are disposed on another craft (not shown) or intermediate station (not shown) in sufficient proximity to permit transmission of high resolution images from camera 38 to the mission computer 14 for processing and anomaly detection thereby.

In the illustrated embodiment, camera 38 is housed in the gimbaled assembly 28, which is attached to the underside of the craft's fuselage. The gimbal 28 preferably includes an integrated Global Positioning System/Inertial Measurement Unit system (GPS/IMU) and is stabilized using feedback logic that links the gimbal's servo-motors and the IMU under software control. Furthermore, the gimbal's integrated GPS can be used to determine the geographical location of the center of the video image.

Anomaly detection software executing on mission computer 14 of the illustrated embodiment utilizes both spectral and spatial methods, as well as supervised and unsupervised classification techniques. It is based on the SSRX (subspace RX) algorithm (or methodology) known in the art (e.g., as disclosed in Winter et al, "Hyperspectral image sharpening using multispectral data," Algorithms and Technologies for Multispectral, Hyperspectral, and Ultraspectral Imagery XI, Proceedings of the SPIE, Volume 5806, pp. 794-803 (2005)) and on the open source RXD algorithm (or methodology), e.g., as disclosed in I. S. Reed and X. Yu, "Adaptive multiple-band CFAR detection of an optical pattern with unknown spectral distribution," IEEE Trans. Acoust., Speech, Signal Processing, vol. 38, pp. 1760-1770, October 1990, that was originally developed to detect anomalies in images generated by hyper-spectral cameras.

In the illustrated embodiment, SSRX is novelly applied to the RGB color video from camera 38 (and video processor 28), and it is adapted to identify anomalies whose Mahalanobis distances correlate with actual or suspected alarm instances (e.g., intrusions or other suspect patterns in video images by the camera 38), e.g., as determined empirically or otherwise based on the expected content of video images in which anomalies are being detected.

In the illustrated embodiment, the occurrence of false alarms (i.e., signaling of false anomalies) otherwise evidenced in the SSRX image (i.e., the image resulting from SSRX processing) is further eliminated through spatial filtering. This is done using image pyramids of the type known in the art. More particularly, it is done by cycling through image pyramids in the SSRX image. This eliminates artifacts and objects of small width in the filtered image that results from the SSRX processing—and, conversely, emphasize objects in that filtered image that have a blob-like geometry. Pixels within regions of the image that remain after such spatial filtering are, then, highlighted in the original video image of the scene so as to call them out as alarms. More generally, such highlighting is performed still images generated from the original video image, A further appreciation of the anomaly detection software utilized in the illustrated embodiment may be attained by reference to the Appendix filed herewith.

The Ground Control Station

Figure 4:
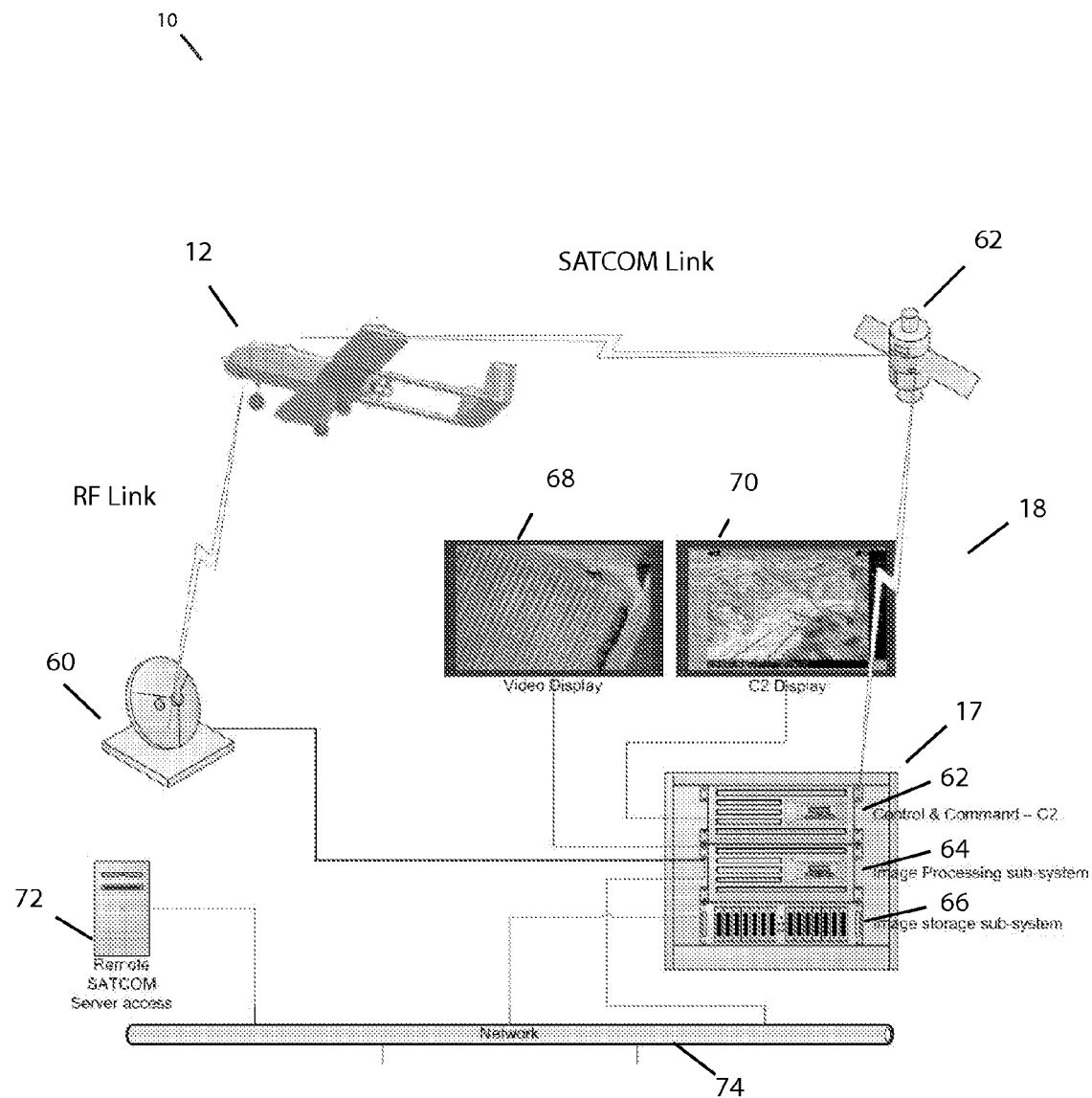
FIG. 4 depicts the SUAS system of FIG. 1 from the perspective of the ground control station.

FIG. 4 depicts the SUAS system 10 of FIG. 1 from the perspective of the ground control station. Although in the illustrated embodiment, this is contemplated to be a station disposed at a ground-based site, in other embodiments it may be disposed in the air or elsewhere. Regardless, for sake of simplicity, it shall be referred to herein as a "ground control station" or "control station."

As noted previously, the system 10 includes a unmanned craft 12 that is coupled for communications with a ground control station 18 via radio frequency (RF) and satellite (SATCOM) links. In the drawing, the former is graphically depicted by a dish antenna 60 coupled with computer 17 at the GCS, though, those skilled in the art will appreciate that such an RF (of alternate) link may be supported in other ways. Likewise, the latter is graphically depicted by a satellite 62 (e.g, supporting both the transfer of command & control information, as well as alarms, alarm images and related data), though, such an alternate link may be provided instead or in addition. Indeed, as noted above, in the embodiments of FIGS. 1-3, dual satellite links are provided between the craft 12 and the GCS 18.

Computer 17 comprises a portable computer (e.g., of the laptop, ruggedized backpack portable computer, or other variety) of the type commercially available in the marketplace as programmed and otherwise adapted in accord with the teachings hereof. To that end, illustrated computer 17 includes command and control subsystem 62, image processing subsystem 64 and image storage subsystem 66. Each of these subsystems may execute in software, firmware or otherwise on separate processor boards (e.g., co-processing cards) resident in the computer 17, as suggested in the drawing, or, alternatively, two or more of them may execute on a common board (e.g., a motherboard).

Illustrated command and control subsystem 62 comprises logic for interfacing with the flight and other operational functions of craft 17, e.g., over a first of the SATCOM links, to facilitate the transfer of command & control information therewith. It can be constructed and operated in the conventional manner known in the art, as adapted in accord with the teachings hereof.

Image processing subsystem 64 comprises logic for processing images relayed from the craft 12 to the GCS, e.g., over a second of the SATCOM links, as well as for generating images based on alarm data and/or images supplied by the craft 12 and/or the image storage subsystem 66.

Illustrated image storage subsystem 66 stores images relayed from the craft 12, as well as those generated by the image processing subsystem 64. In addition, disk drives and other media in the image storage subsystem can retain terrain, obstacle and other databases utilized in operation of the system.

The computer 17 is coupled to one or more displays, which may be integral to the computer (as in the case of a laptop computer) or separate. Two exemplary images generated by the computer 17 on such displays are shown in the drawing: a video display image 68 depicting a scene in the vicinity of craft 12 (e.g., highlighting an alarm or other event of interest) and a command & control image 70 for situational awareness. Of course, it will be appreciate that these images are merely shown by way of non-limiting example of the types of images generated by computer 17 for use by GCS personnel.

As further shown in the drawing, computer 17 may be coupled to remote SATCOM server 72 by way of network 74 or otherwise.

Figure 5:
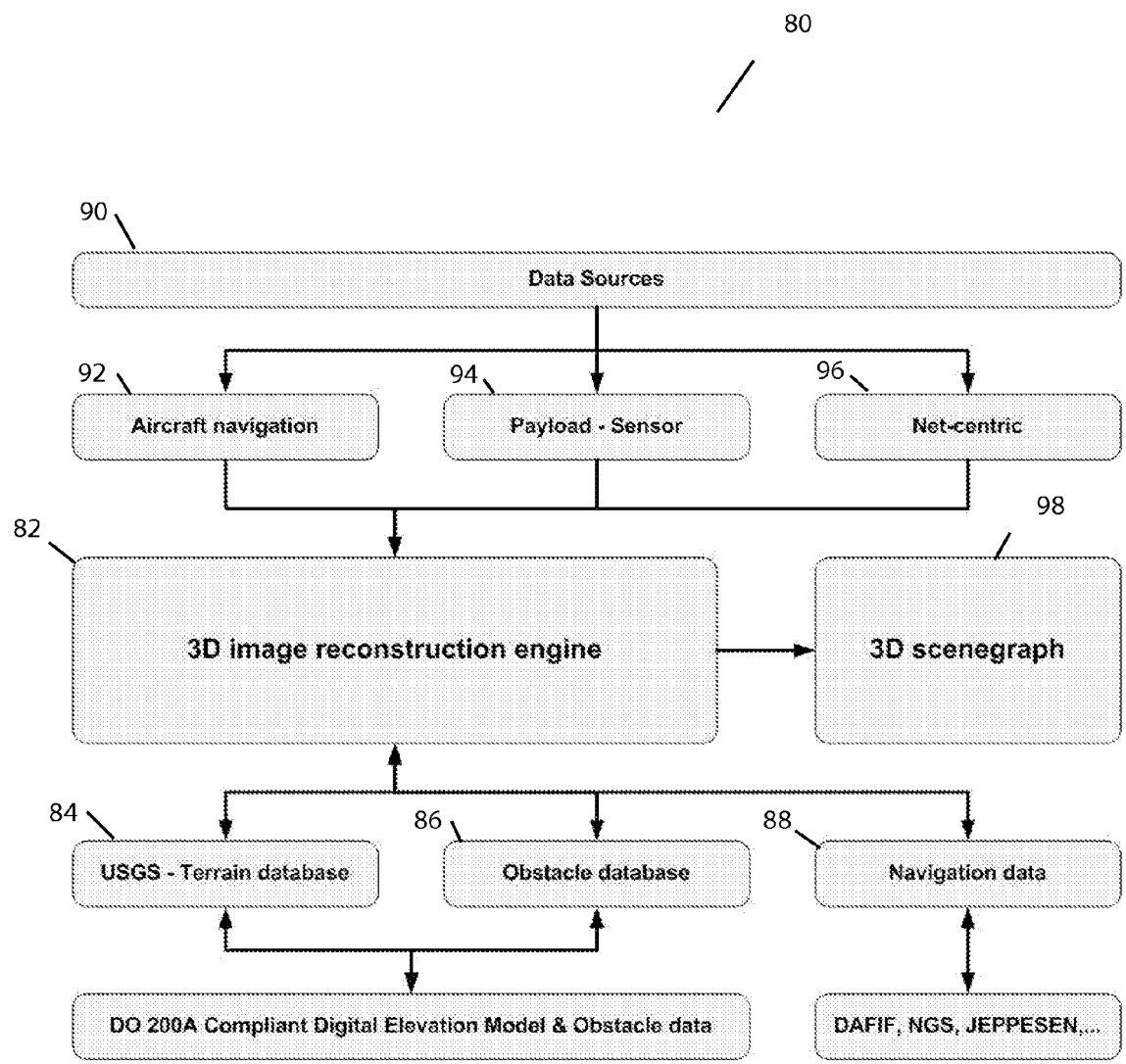
FIG. 5 depicts a flow diagram of a synthetic vision system according to the invention.

FIG. 5 is a flow diagram of a three-dimensional (3D) synthetic vision system 80 executing within image processing subsystem 64 on the computer 17 at the ground control station to permit an operator to visualize events happening in and around the operating aircraft 12 or regions in which it detects alarms. Examples of the images generated by system 80 are provided in FIGS. 6a, 6b, 7, 8, 9 and 10, discussed elsewhere herein.

The system 80 includes a 3D image reconstruction engine 82 that takes input from terrain database and obstacle databases 84, 86, respectively, as well as from navigation database 88, as shown. The engine 82 also takes input from data sources 90 that include, in the illustrated embodiment, aircraft navigation data 92, payload sensor data 94 and net-centric data 96, again, as shown. In the illustrated embodiment, the aircraft navigation data 92 and payload sensor data 94 are supplied from the craft 17, e.g., via the SATCOM link. The engine 82 generates a 3D scene graph 98, e.g., for use in generating displays, e.g., on a console coupled to GCS computer 17.

Terrain database 84 and obstacle database 86 of the illustrated embodiment comprises digital elevation model terrain and obstacle data, respectively, which may be compliant, for example, with DO 200A standards, as illustrated, or otherwise. The terrain database 84 is subject to two constraints: resolution and integrity. The Digital Elevation Model (DEM) and the Digital Terrain Elevation Data (DTED) Level drive the resolution. DTED Level [1, 2 up to 5] determines the resolution of the grid of points. For instance, DTED Level 1 is the basic resolution for elevation and/or terrain roughness in a digital format. DTED1 is a uniform matrix of terrain elevation values with post spacing every 3 arc seconds (approximately 90 meters). This level is most adequate when flying at several thousand feet and looking at mountains, but would not be suitable to land an aircraft in a non-airport environment.

Obstacle database 86 represents all forms of terrain and other items that can be a potential hazard to aircraft landing at a particular airport or otherwise traveling through airspace in which the craft is expected to fly. Television and radio antennas, tall buildings and plants, for example, are preferably precisely located and represented in the database 86 so that they can be displayed in order to be avoided.

In case of military applications, net-centric data of interest can be incorporated into the scene graphs 98 for display in scenery.

Navigation database 88 may comprise Digital Aeronautical Flight Information File (DAFIF) data on airports, navaids, waypoints, special-use airspace, and so forth, and other navigational data from National Geodetic Survey (NGS) and Jeppesen, and so forth. Navigation databases 18 may not be very important when flying a UAV in certain military situations, but are more relevant when a small UAV is flying inside National Airspace. For instance, a small UAV flying under a FAA Certificate Of Authorization (COA) must be aware of the surrounding airspace (i.e. airport class, communication requirements, approaches, way-points, procedures, radio frequencies etc.)

Operation

Most prior art UAVs send video in real time to their associated GCS using a line-of-sight (LOS) data link. The bandwidth limitations of small UAVs make beyond-line-of-sight (BLOS) operations nearly impossible using commercial, low-orbit satellite communications (SATCOM), which are typically limited to 9600 bps (bytes per second) throughput and, hence, are considered to be "low speed" links (e.g., relative to modern network and data link communications speeds).

The illustrated embodiment overcomes these limitations utilizing the architecture shown in FIGS. 1 and 4. The mission computer 14 uses anomaly detection software to identify high-risk targets in the video image acquired by camera 38 (and video processor 28) and to send alarms (or "actionable intelligence" data) to the GCS using the SATCOM link. That link, in the illustrated embodiment, is low-speed, i.e., it has a throughput of 9600 bps, though, other embodiments may vary from this. These alarms can identify the actual or suspected nature of the anomaly, as well as the location where it was detected. In addition, the alarm can be supplemented by a highly compressed color image that is transmitted to the GCS via the SATCOM link and that shows both an entire video frame including the anomaly. Alternatively, or in addition, if the craft 12 is within line-of-sight of the GCS 18, the alarm can be supplanted via an image or video stream transmitted from the craft to the GCS via the RF data link. The alarm and, if available, the corresponding image are displayed by computer 17 at the GCS, along with locational information derived from the on-board integrated GPS/IMU system—or, in preferred embodiments, along with a three-dimensional synthetic image constructed by system 80 utilizing the terrain, obstacle and/or navigation databases of a scene of the terrain (or other region) in which the alarm occurred.

Alternatively, or in addition, the system 80 can utilize inflight navigational data supplied by the craft 12, in conjunction with data from the terrain, obstacle and/or navigational databases, to generate three-dimensional synthetic images of the airspace and/or terrain in a vicinity of the craft 12. Those images can be enhanced to facilitate operational awareness as discussed below.

In operation, the craft 12 is launched and recovered using radio control (RC) in the conventional manner known in the art. Once stable flight has been established, control is transferred to one of the on-board autopilot systems 40, with the other autopilot system 42 serving as a backup. The autopilots 40, 42 of the illustrated embodiment are preprogrammed with way points that trace the location of a corridor or other region over which flight is to occur. Such a corridor may be, for example, a right-of-way for electricity, crude oil, petroleum, natural gas, and so forth, requiring inspection. The location of one or more emergency recovery areas may also pre-programmed into the autopilots in case emergency situations occur.

The way points as well as other autopilot functions can be altered in flight from the ground control station (GCS) via the satellite communications (SATCOM) link, shown here supported by onboard modems 34, 36 and antenna 30, as well as by the "SATCOM Data-Link" depicted in GCS 18. This capability can be used when the on-board real-time processor 14 detects an alarm in the corridor or other region being surveyed and the GCS operator decides another look is required. The GCS-based operator can then instruct the craft (via the SATCOM link) to fly a circular pattern centered on the alarm's location and keeping the gimbaled camera aimed at that location.

As noted above, the mission computer 14 uses the anomaly detection software to identify high-risk targets in the video image acquired by camera 38 (and video processor 28) and to then raise an alarm to the operator at the GCS 18 via transmission over the SATCOM link identify the actual or suspected nature of the anomaly, as well as the location where it was detected.

Figure 10:
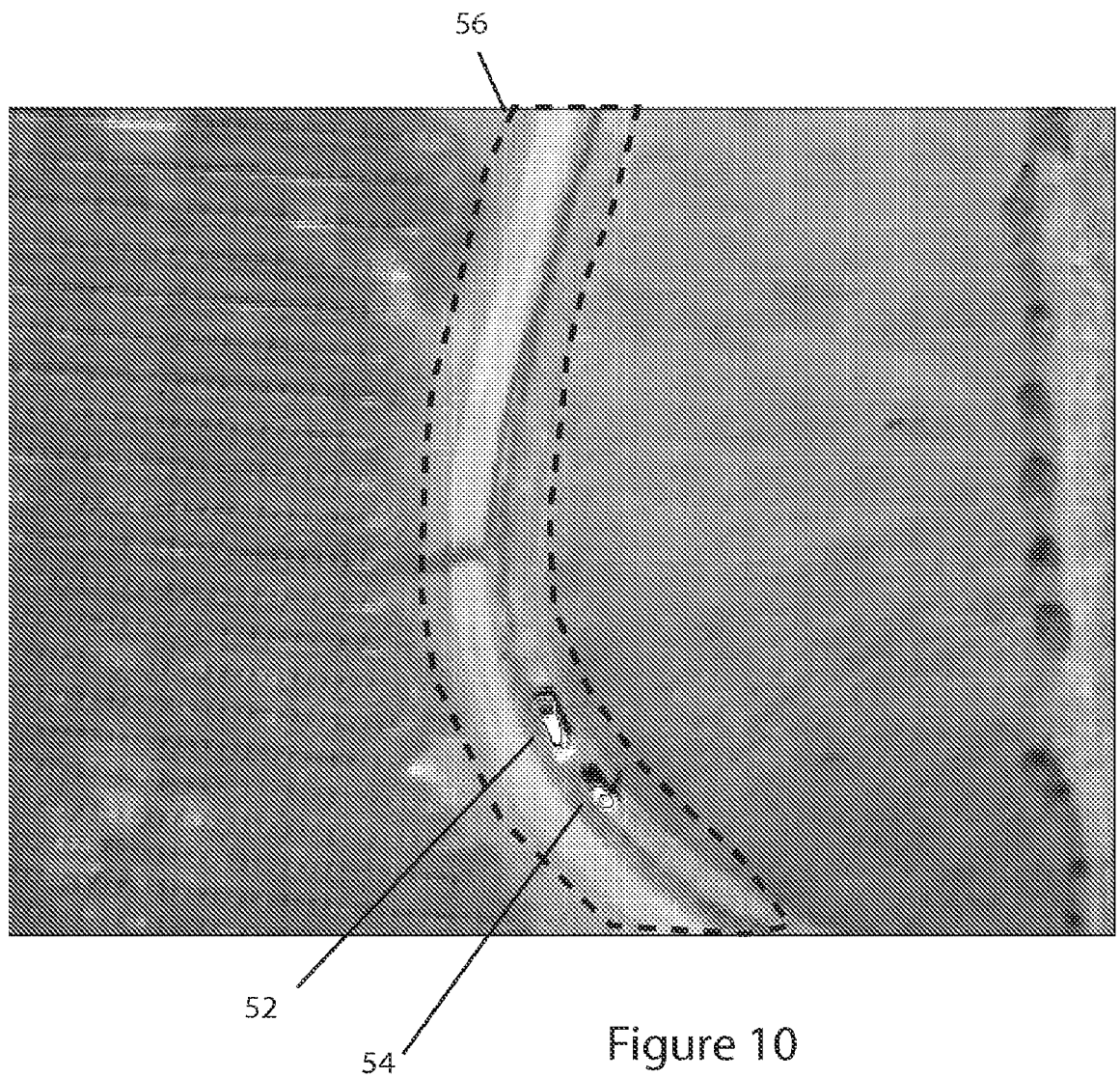
FIG. 10 depicts an image generated in connection with an anomaly-based alarm by a system according to the invention.

This alarm can be supplemented by sending a highly compressed color image (referred to as an "alarm image"), again, over the SATCOM link, with a video frame showing the suspected anomaly. An example of such an image is shown in FIG. 10. This alarm image shows two cars 52, 54 that have been parked in the right-of-way 56 (demarked by dashed line). The anomaly detection software has detected the cars 53, 54, marked them with black highlights (not shown) and notified the GCS computer 17 of the detection. Alternatively, or in addition, if the craft 12 is within line-of-sight of the GCS 18, the alarm can be supplanted via an image or video stream transmitted from the craft to the GCS via the RF data link.

Figure 9:
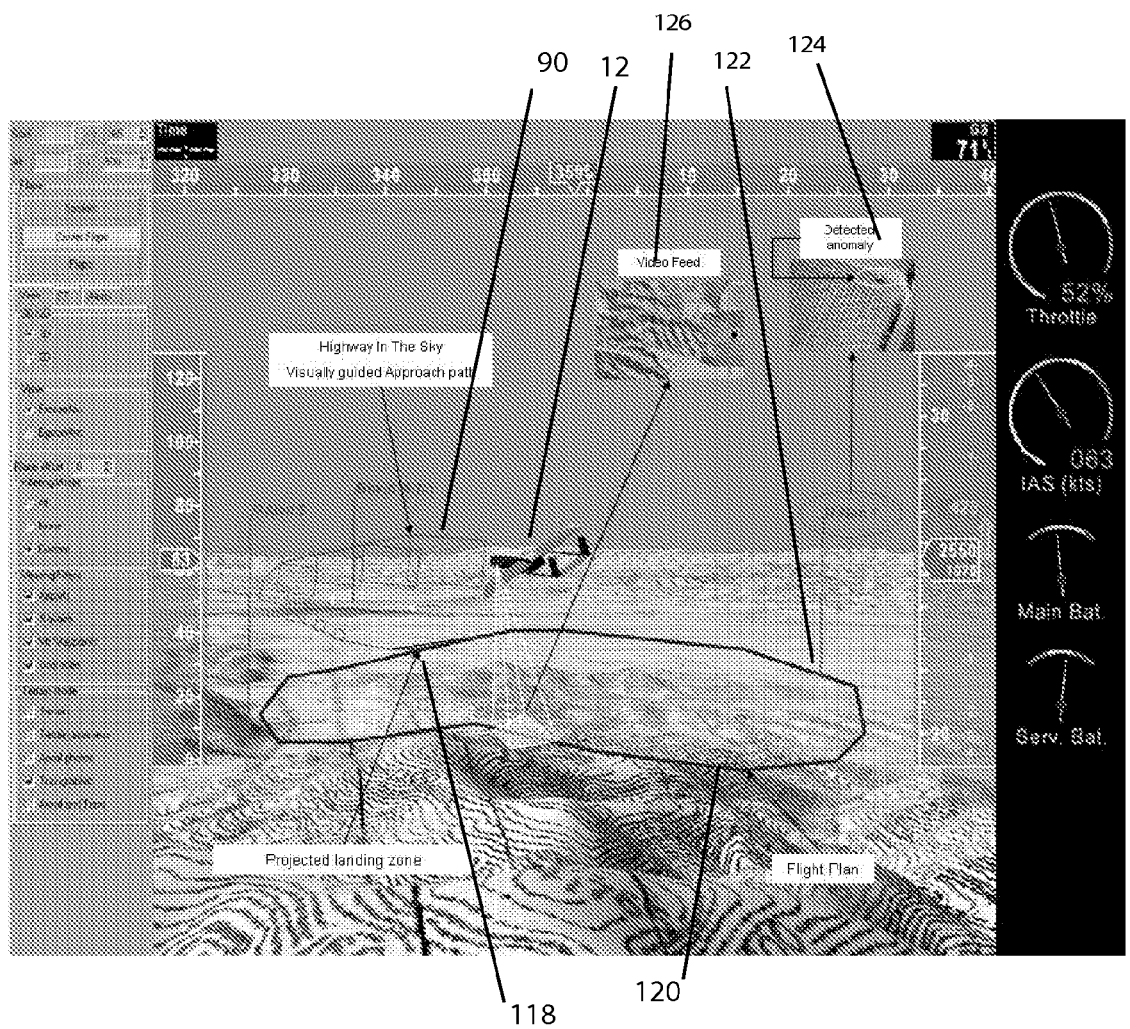
FIG. 9 depicts an integrated synthetic image of the type generated by a system according to the invention.

The alarm and, if available, the alarm image, is displayed at the GCS, along with locational information derived from the on-board integrated GPS/IMU system—or, in preferred embodiments, along with a three-dimensional synthetic image constructed by system 80 utilizing the terrain, obstacle and/or navigation databases of a scene of the terrain (or other region) where the alarm occurred. Such an image is depicted in FIG. 9, showing not only a synthetic image display of the region in vicinity of the craft 12 and an alarm, but also the location of the alarm 122 and an alarm image 124 pertaining thereto.

The GCS operator can act immediately on the alarm and/or superimpose such an image onto images captured on previous flights and then determine if the alarm poses an imminent danger. If necessary, the GCS operator can instruct the craft 12 to return to the target and capture additional imagery.

A typical mission by craft 12 can take approximately four hours to fly. After the craft 12 has landed, the disk drive 30 is removed and the digital AVI files are transferred to a computer 17 at the GCS, which can use a hardware accelerator board (not shown) to perform real-time video enhancement, fusion, stabilization and mosaicking, and to place the processed video into a geospatial context so it can be directly compared with video taken during previous flights. Classical change detection algorithms of the type known in the art is then used to identify video segments that a video analysts would then manually review.

Data Fusion and Enhanced Vision

Figure 6A:
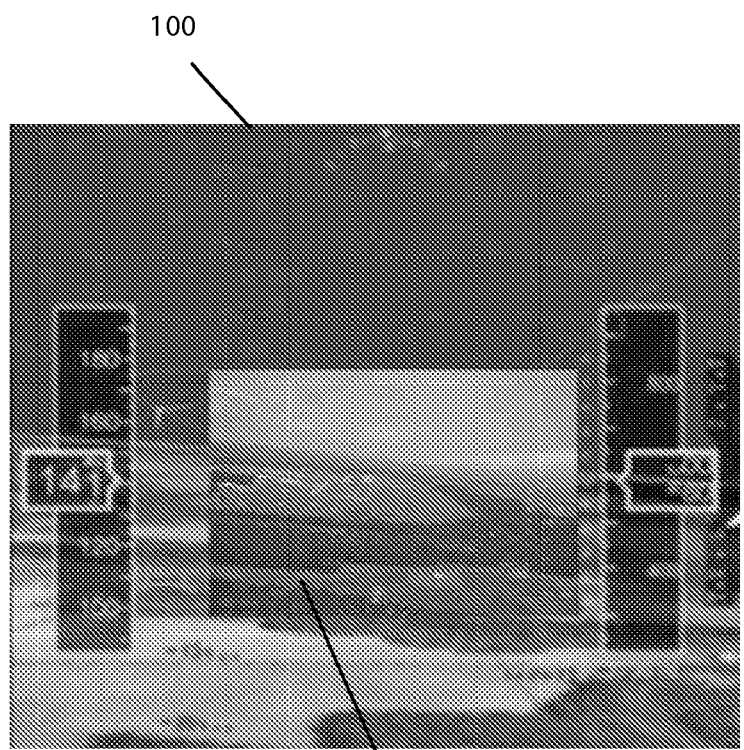
FIG. 6a depicts a FLIR-based Enhanced Synthetic image of the type generated by a system according to the invention.

UAV 12, in many applications, needs to land in non-controlled environments such as an unimproved landing strip. It is necessary that the system "knows" its landing environment with enough details (i.e. enough resolution) to land safely. To this end, three-dimensional (3D) synthetic vision system 80 can generate an image depicting the airspace and/or terrain in and around craft 12 that fuses synthetic vision frames with Forward Looking Infra Red (FLIR) images. Such an image is depicted in FIG. 6a. It includes an outer frame 100 comprising a FLIR image sent from the UAV 12 to the CGS computer 17, on which is superimposed an inner frame 102 comprising a three-dimensional synthetic image generated by system 80 for the corresponding vantage point from which the FLIR image was captured.

A system 10 having this capability is referred to as an Enhanced and Synthetic Vision System (ESVS) and provides the ability to display transient elements in a real-time scene and highlight potential landing hazards. In addition to improving safety, the imagery can be analyzed in real time by an operator or logic executing on computer 17 to detect anomalous components in a particular scene.

The use of a real-time terrain-morphing engine that combines sensors such as scanning radar or LIDAR data with synthetic vision frames is also of interest in mountainous areas where terrain altitude may vary rapidly or where rough surfaces exists with rocks and or debris. This can be used, for example, to aid landing for helicopters operating in brownouts or whiteout conditions by bringing the terrain resolution at 30 cm and therefore substantially improve the "terrain knowledge" where an aircraft plans to land.

Figure 6B:
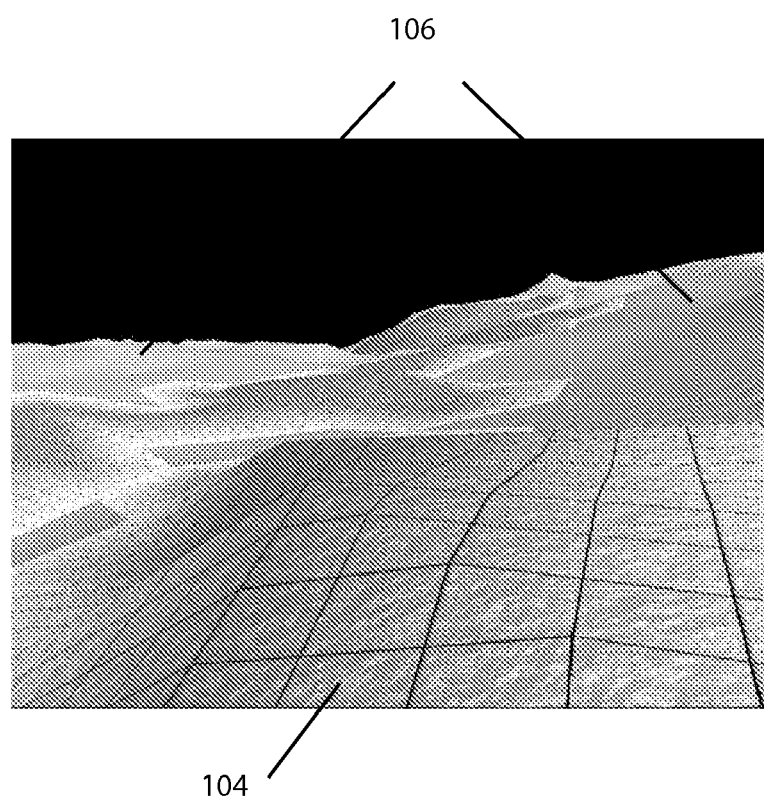
FIG. 6b depicts a terrain morphing image of the type generated by a system according to the invention.

To this end, three-dimensional (3D) synthetic vision system 80 can generate an image that superimposes a three-dimensional image generated from scanning radar or LIDAR data with a three-dimensional synthetic image generated from the terrain, obstacle and/or navigational databases 84, 86, for the corresponding locale in the vicinity of craft 12. Such an image is shown in FIG. 6b, including detailed regions 104 generated from scanning radar or LIDAR data and less detailed regions 106 generated from the databases 84, 86, 88. Use of such images substantially increase operational capabilities and safety in landing in unprepared/unimproved landing sites.

Terrain and Traffic Avoidance

Figure 7:
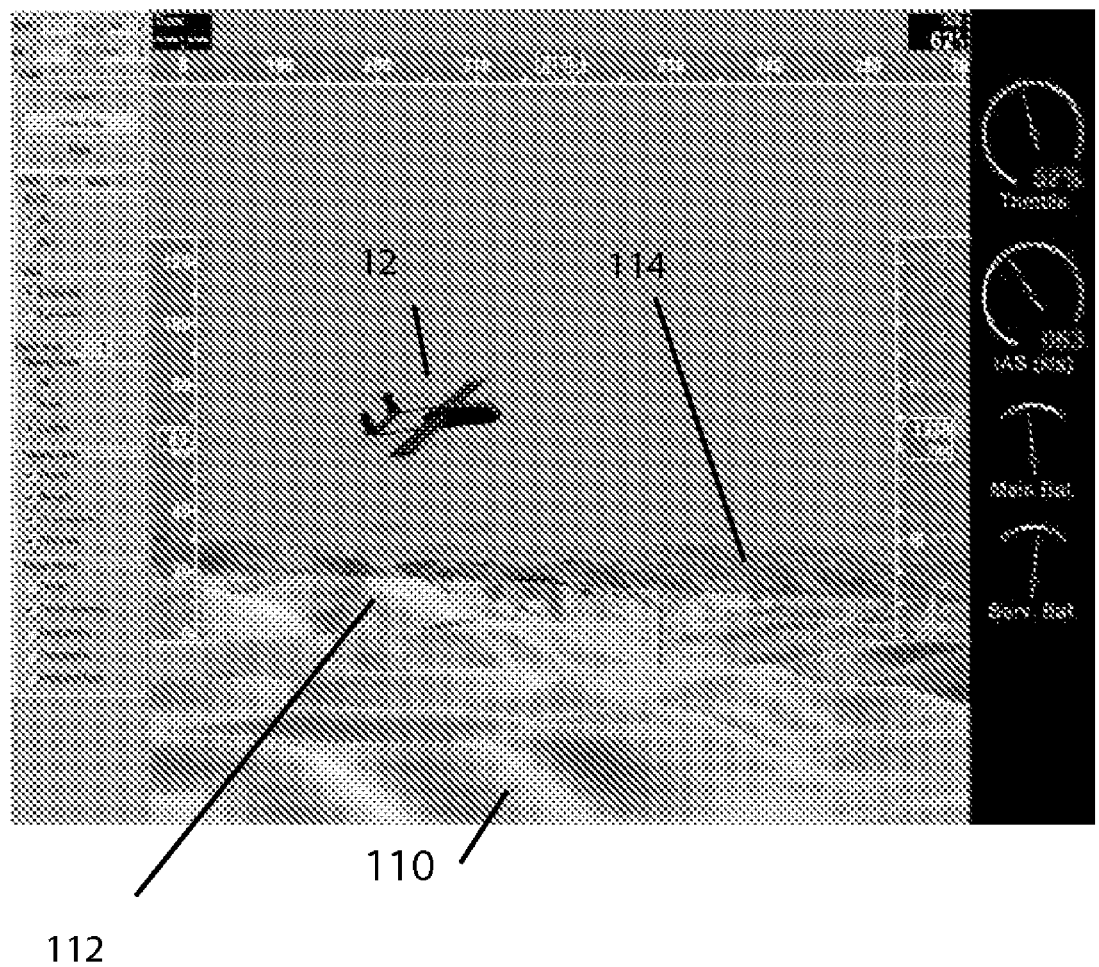
FIG. 7 depicts dynamic terrain awareness image of the type generated by a system according to the invention.

A Terrain Awareness Warning System (TAWS) helps avoid Controlled Flight Into Terrain (CFIT). The illustrated embodiment includes a TAWS option to enable to operator to configure the dynamic coloration of the terrain based on the relative altitude of the aircraft Above Ground Level (AGL) as shown in FIG. 7. Referring to that drawing, terrain 110 below a first specified height is tinted in a first color (e.g., green) in synthetic images of terrain in vicinity of the craft 12; terrain 112 above the first specified height, but below a second specified height is tinted in a second color (e.g., yellow); terrain 114 above the second specified height is depicted in a third color, e.g., red.

The three-dimensional (3D) synthetic vision system 80 of the illustrated embodiment can generate images, such as those shown in FIG. 7, that provide for such dynamic visual terrain awareness. This can be augmented (e.g., by logic and sound cards executing and computer 17) with audio advisory when the system detects a path potentially leading to Controlled Flight Into Terrain (CFIT). The use of a high integrity airborne terrain database 84 correlated with inertial and GPS data provided by craft 12 provides a high level of autonomous terrain awareness in addition to the mission controller display.

The FAA requires that unmanned aerial vehicles provide an Equivalent Level Of Safety as a manned aircraft regarding the See and Avoid regulations. In a manned aircraft, the "see-and-avoid" function is provided by the Pilot In Command (PIC) and is his direct responsibility. The illustrated SUAS system 10 replicates the see and avoid function inside the UAV 12 with one or multiple sensors (such as an active collision avoidance system for non-collaborative targets, as well as an ADS-B transceiver or a Mode C transponder) to detect other traffic and perform appropriate avoidance maneuvers.

Figure 8:
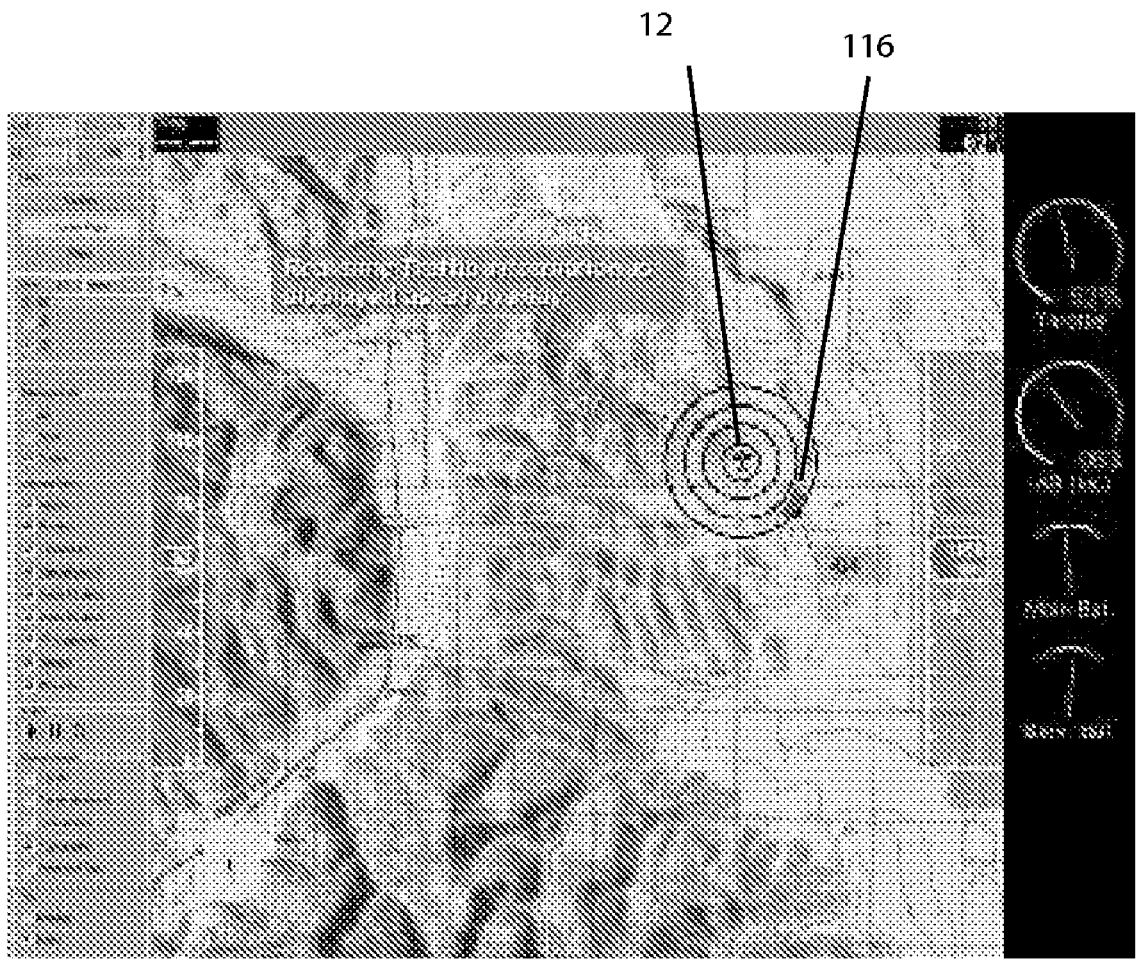
FIG. 8 depicts a traffic display overlay image of the type generated by a system according to the invention.

To this end, the three-dimensional (3D) synthetic vision system 80 of the illustrated embodiment can generate images, such as those shown in FIG. 8, that provide for such display including real-time detected traffic 116, the relative positions of that traffic and craft 12. In embodiments, where a ground radar provides coverage for a flight zone, traffic detected by that radar is also integrated into images of the type generated by system 80 and shown in FIG. 8. Logic executing on computer 17 can additionally determine if there are any conflict between data sources.

Highway in the Sky & Guided Approaches

One of the operational issues associated with small UAVs is the relatively high responsibility placed on individuals for various operational phases such as pre-flight, take off and landing. In today's environment, a typical system would include at least a pilot, perhaps a pre-flight technician, a mission controller, and a radar specialist for airspace de-confliction. In order to reduce the manual operations associated with a particular mission, more automation is needed at several levels.

Referring to FIG. 9, the three-dimensional (3D) synthetic vision system 80 can generate images depicting airspace and/or terrain in and around the operating aircraft 12 that include a "Highway-In-The-Sky" (HITS) visualization scheme to identify safe flight pathways and landing approaches. Where used with approaches, these are specifically designed to land the UAV 12 safely, taking in account surrounding terrain, obstacles and any other areas of concern.

Integrating Navigation and Actionable Intelligence

The primary purpose of the UAV 12 is to gather data, and the system 10 must translate this gathered data into actionable intelligence. Operators at the GCS 18, however, must maintain control on both navigation and mission. The three-dimensional (3D) synthetic vision system 80 generates images of the type shown in FIG. 9 to integrate this information into a montage that permits the operators to conduct the mission while maintaining a high level of situational awareness. By way of example, FIG. 9 is a three-dimensional synthetic image showing the airspace and terrain in vicinity of craft 12, along with a HITS display to landing (as discussed above), a projected landing zone 118, a demarcation of a projected flight plan 120, the location of an alarm 122 and an enhanced image of the corresponding anomaly 124, and a video feed 126 from a region within the flight plan.

Such an image may be generated on displays coupled to GCS computer 17, as well as being made available through a Remote Receiver Terminal that is receiving mission data via a SATCOM for use by field personnel. Alternatively, such a field computer can perform identical processing to that discussed above in connection ground station computer 17 in order to reconstruct, on its own, the complete situational imagery in real time.

Airborne Processor

Figure 11:
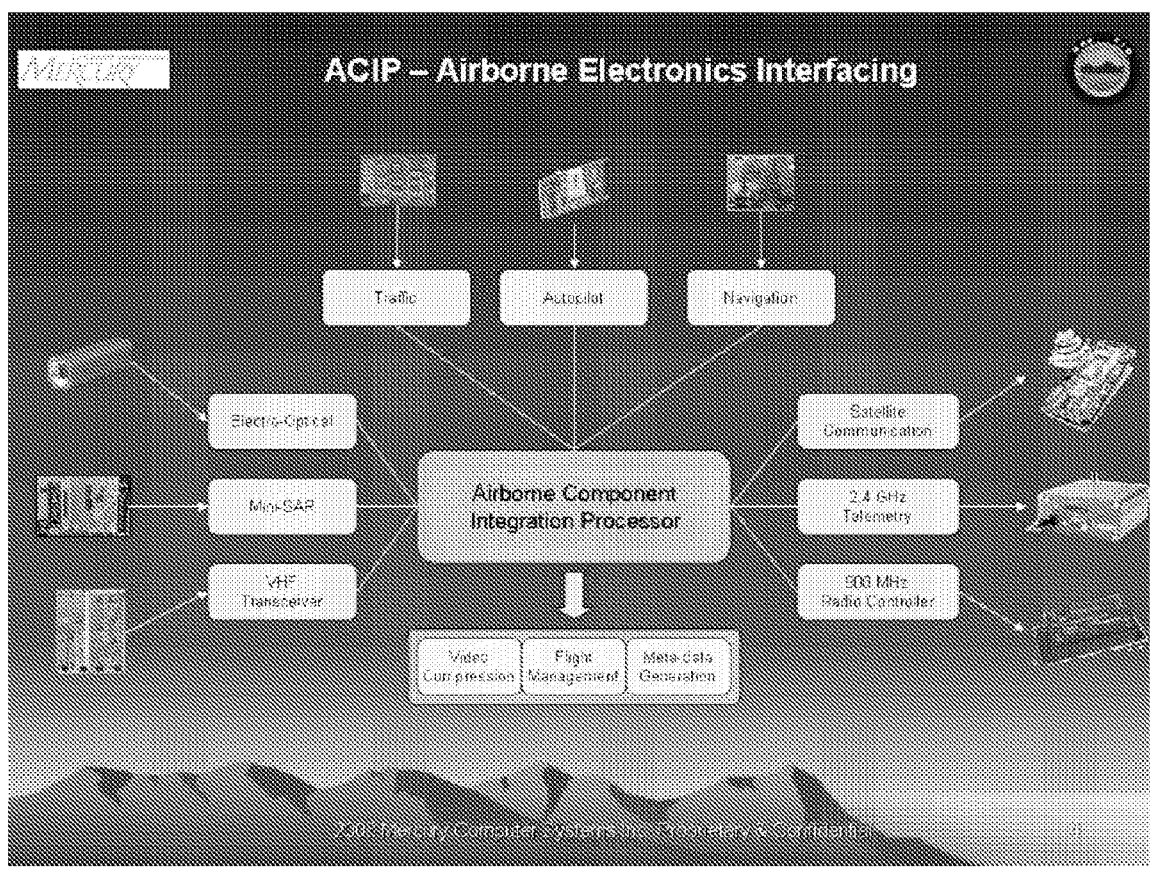
FIGS. 11-13 depict aspects of an airborne processor that can be used with practice of the invention.
Figure 12:
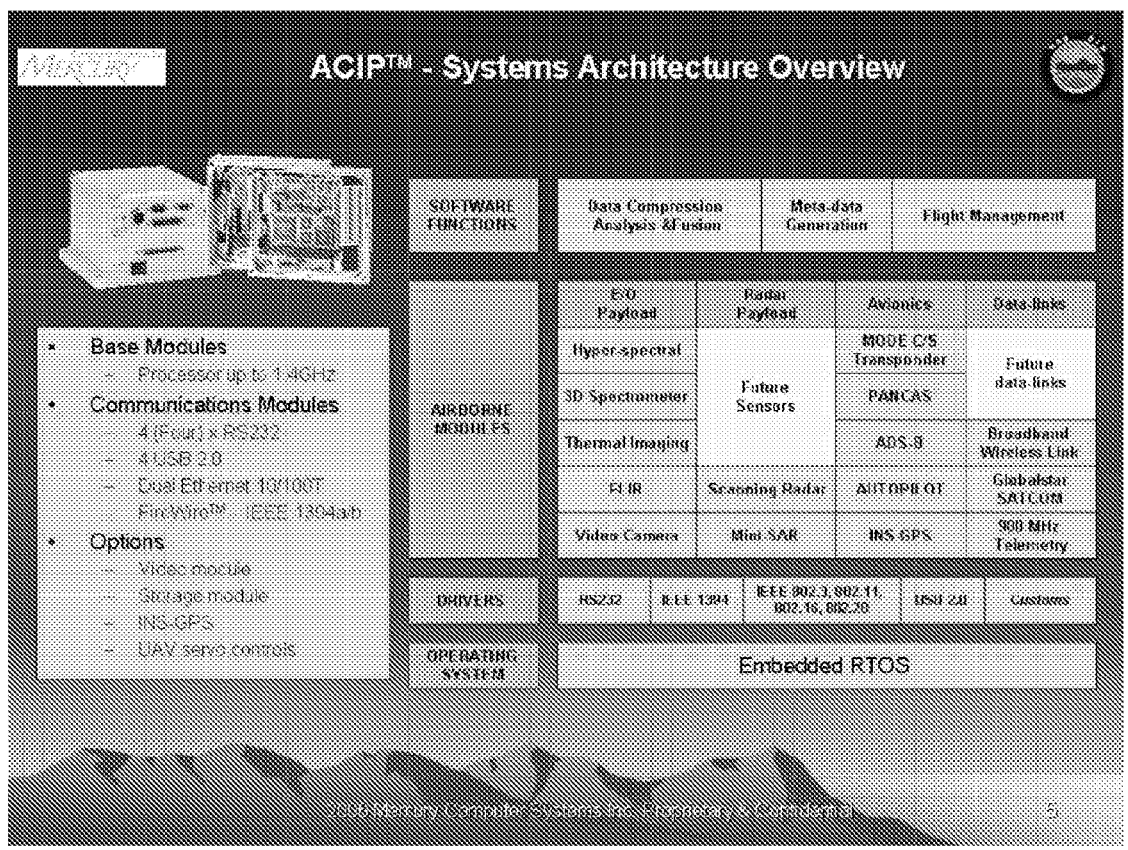
Figure 13:
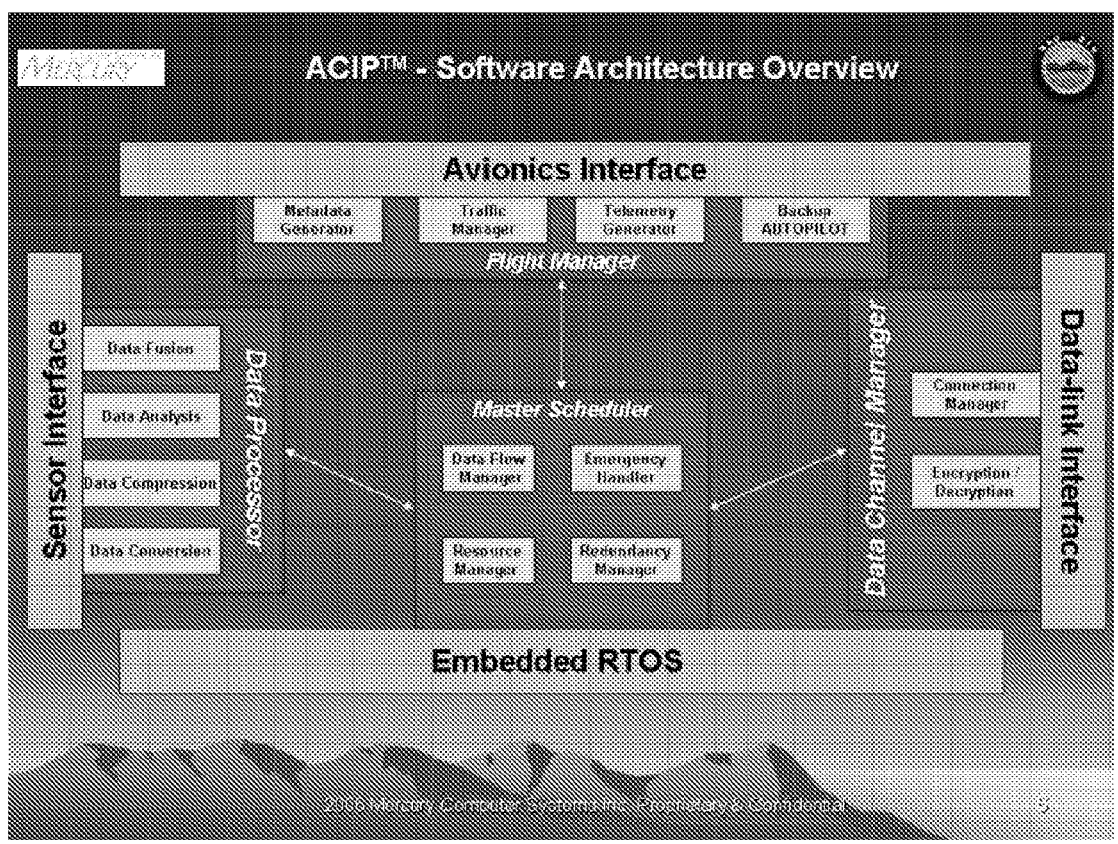

In some embodiments, the aircraft-based elements shown in FIGS. 1-3 and discussed above are integrated into circuity depicted in FIGS. 11-13 and discussed below. Referred to as "ACIP," this integrates in a "plug & play" fashion all the airborne electronics & associated functions typically found in small tactical UAV, e.g.:
1. Sensor payload (Camera, radar, IR etc)
2. Avionics (INS-GPS, autopilot, see & avoid etc.)
3. Data-links (telemetry, satcom etc.)
4. Flight management The ACIP stands in contrast to prior art tactical UAV systems, which often have control and payload modules as separate entities that run in a non-integrated manner, which creates following problems:
1. Complicated control & command mechanism.
2. Inefficient usage of payload space, communication bandwidth and other critical resources on board the UAS
3. Non-scalable and inflexible configuration. Capacity increase or payload type change are not easy tasks and often result in total redesign of the payload configuration and control software.

On the other hand, while designers of some modern aircrafts like corporate jets and airliners have incorporated an integrated approach in their on board avionics system, the technologies used in those systems are not applicable in a tactic UAV due to the dramatic differences in terms of piloting method (manned vs. unmanned), on board resources (payload space, power, etc.)

ACIP is aimed to solve the paradox of not having enough on board resources, but the need to have more control and communication capability of the UAS. The ACIP is designed to be a highly autonomous navigation system with collision avoidance capability and INS/GPS based redundant autopilot function. Yet it also provide highly reliable communication links to the ground control station using multiple technologies such as satellite, broadband wireless (Wifi and WiMAX), and VHF Radio Control.

CONCLUSIONS

Described herein are systems and methods meeting the objects set forth above, among others. It will be appreciated, of course, that the embodiments discussed here are merely examples of the invention and that other embodiments, varying from those shown here fall within the scope of the invention. Thus, by way of non-limiting example, it will be appreciated that the video camera 38 and video processor 28 may form a single unit, such as in the case of a digital video camera. Moreover, it will be appreciated that the SATCOM links (though, of generally low-speed relative to other forms of communication) may support transmission speeds higher (or lower) than those mentioned above. In view of the foregoing, what we claim is:

The invention claimed is:

1. A system for unmanned vehicle operation, comprising
A. a control station,
B. a craft disposed remotely from the control station,
C. an image acquisition device coupled to the craft and arranged for generating one or more images of one or more scenes in a vicinity of the craft,
D. a first digital data processor coupled to the image acquisition device, the first digital processor identifying anomalies in one or more scenes in one or more images generated by the image acquisition device,
E. a second digital data processor disposed at the control station in communications coupling with the first digital data processor, the second digital data processor responding to signaling from the first digital data processor indicative of an anomaly by generating an image representative of a scene in which the anomaly was detected, and
F. wherein the first digital data processor is coupled with the second digital data processor by way of any of a low-bandwidth and/or small-antenna satellite link.

2. The system of claim 1, wherein the craft includes a dish antenna that supports communications comprising the satellite link.

3. The system of claim 2, wherein the disk antenna has a diameter of about 3 inches or less.

4. The system of claim 2, wherein the disk antenna has a diameter of about 5 inches or less.

5. The system of claim 2, wherein the disk antenna has a diameter of about 10 inches or less.

6. The system of claim 1, wherein the satellite link supports communications of about 9600 bps (bytes per second) or less.

7. The system of claim 1, wherein the image acquisition device is a video camera.

8. The system of claim 2, wherein the image acquisition device acquires video images of terrain, airspace, or other scenes in a vicinity of the craft.

9. The system of claim 1, wherein the first digital data processor is disposed on the craft.

10. The system of claim 1, wherein the second digital data processor is disposed at a distance that is beyond line of sight from the craft.

11. A system for unmanned vehicle operation, comprising
   A. a control station,
   B. a craft disposed remotely from the control station,
   C. an image acquisition device coupled to the craft and arranged for generating one or more images of one or more scenes in a vicinity of the craft,
   D. a first digital data processor coupled to the image acquisition device, the first digital processor identifying anomalies in one or more scenes in one or more images generated by the image acquisition device,
   E. a second digital data processor disposed at the control station in communications coupling with the first digital data processor, the second digital data processor responding to signaling from the first digital data processor indicative of an anomaly by generating an image representative of a scene in which the anomaly was detected, and
   F. wherein the image acquisition device is a video camera.

12. The system of claim 11, wherein the first digital data processor and the second digital data processor are coupled via any of a low-bandwidth and/or small-antenna satellite link.

13. The system of claim 12, wherein the craft includes a dish antenna that supports communications comprising the satellite link.

14. The system of claim 12, wherein the disk antenna has a diameter of about 3 inches or less.

15. The system of claim 11, wherein the satellite link supports communications of about 9600 bps (bytes per second) or less.

16. A digital data processor for use in remote surveillance, the digital data processor comprising
   A. a first subsystem in communications coupling with a remote craft including an image acquisition device, the first subsystem including logic that communicates command & control information with the craft,
   B. a second subsystem in communications coupling with the first subsystem and with the craft via a satellite communications link, the second subsystem including logic that responds to signaling indicative of an anomaly in a vicinity of the craft by generating an image of scene including a location of that anomaly,
   C. wherein the satellite communications link is any of a low-bandwidth and/or small-antenna satellite communications link.

17. The system of claim 16, wherein the disk antenna has a diameter of about 3 inches or less.

18. The system of claim 16, wherein the satellite link supports communications of about 9600 bps (bytes per second) or less.

19. The digital data processor of claim 16 further comprising a third subsystem in communications coupling with the second subsystem, the third subsystem storing images relayed from the craft and/or generated by the second subsystem.

20. The digital data processor of claim 16, wherein the second subsystem comprises a three-dimensional synthetic vision system that generates synthetic images of scenes within a vicinity of the craft that include the anomaly.

21. The digital data processor of claim 20, wherein the synthetic vision system generates synthetic images that highlight a location of the anomaly.

22. The digital data processor of claim 16, comprising any of a terrain, obstacle and/or navigational database.

23. A digital data processor for use on a surveillance aircraft, comprising
   A. a video processor that is coupled to an image acquisition device disposed on the craft, the image acquisition device generating one or more images of one or more scenes in a vicinity of the craft,
   B. a first digital data processor coupled to the image acquisition device, the first digital processor identifying anomalies in one or more scenes in one or more images generated by the image acquisition device,
   C. where the image acquisition device is a video camera.

24. The digital data processor of claim 23, wherein the first digital processor utilizes an SSRX (subspace RX) methodology.

25. The digital data processor of claim 24, wherein the first digital processor applies the SSRX methodology to images generated by the video camera.

26. The digital data processor of claim 25, wherein the first digital processor applies the SSRX methodology to RGB color images generated by the video camera.

27. The digital data processor of claim 25, wherein the first digital processor applies the SSRX methodology to identify anomalies whose Mahalanobis distances correlate with actual or suspected alarm instances.

28. The digital data processor of claim 25, wherein the first digital processor performs spatial filtering on images resulting from application of the SSRX methodology.

29. The digital data processor of claim 28, wherein the first digital processor utilizes image pyramids to perform said spatial filtering.

30. The digital data processor of claim 28, wherein the first digital processor performs said spatial filtering in order to eliminate any of artifacts and objects of small width.

31. The digital data processor of claim 28, wherein the first digital data processor highlights an image generated from the video camera in accord with results of the spatial filtering.

32. A digital data processor for use on a surveillance aircraft, comprising a chassis having
   A. plug-and-play logic for sensor payload management,
   B. plug-and-play logic for avionics,
   C. plug-and-play logic for datalink management and communications,
   D. plug-and-play logic for flight management.

33. The digital data processor of claim 32, comprising an embedded real-time operating system.

34. The digital data processor of claim 33, wherein the real-time operating system supports a master scheduler and one or more of a data flow manager, an emergency handler, a resource manager and a redundancy manager.

35. The digital data processor of claim 32, comprising a data channel manager that includes one or more of a connection manager and an encryption/decryption module, each of which is coupled to a data-link interface.

36. The digital data processor of claim 32, comprising a flight manager that includes one or more of a metadata generator, a traffic manager, a telemetry generator and a backup autopilot, each of which is coupled to an avionics interface.

37. The digital data processor of claim 32, comprising a data processor that executes one or more of a data fusion module, a data analysis module, a data compression module and a data conversion module, each of which is coupled to a sensor interface.

38. A system for unmanned vehicle operation, comprising
   A. a control station,
   B. a craft disposed remotely from the control station,
   C. an image acquisition device coupled to the craft and arranged for generating one or more images of one or more scenes in a vicinity of the craft, D. a first digital data processor coupled to the image acquisition device, the first digital processor identifying anomalies in one or more scenes in one or more images generated by the image acquisition device, E. a second digital data processor disposed at the control station in communications coupling with the first digital data processor, the second digital data processor responding to signaling from the first digital data processor indicative of an anomaly by generating an image representative of a scene in which the anomaly was detected, F. wherein the first digital data processor is coupled with the second digital data processor by way of any of a low-bandwidth and/or small-antenna satellite link, and G. wherein the image acquisition device is a video camera.

39. The system of claim 38, wherein the first digital data processor utilizes an SSRX (subspace RX) methodology.

40. The digital data processor of claim 39, wherein the first digital processor applies the SSRX methodology to images generated by the video camera.

41. The digital data processor of claim 40, wherein the first digital processor applies the SSRX methodology to RGB color images generated by the video camera.

42. The digital data processor of claim 40, wherein the first digital processor applies the SSRX methodology to identify anomalies whose Mahalanobis distances correlate with actual or suspected alarm instances.

43. The digital data processor of claim 40, wherein the first digital processor performs spatial filtering on images resulting from application of the SSRX methodology.

44. The digital data processor of claim 43, wherein the first digital processor utilizes image pyramids to perform said spatial filtering.

45. The digital data processor of claim 43, wherein the first digital processor performs said spatial filtering in order to eliminate any of artifacts and objects of small width.

46. The digital data processor of claim 43, wherein the first digital data processor highlights an image generated from the video camera in accord with results of the spatial filtering.

47. The system of claim 38, wherein the second digital data processor comprises a first subsystem in communications coupling with a remote craft including an image acquisition device, the first subsystem including logic that communicates command & control information with the craft.

48. The system of claim 39, wherein the second digital data processor comprises a second subsystem in communications coupling with the first subsystem and with the craft via a satellite communications link, the second subsystem including logic that responds to signaling indicative of an anomaly in a vicinity of the craft by generating an image of scene including a location of that anomaly.

49. A method for unmanned vehicle operation, comprising

A. generating, with an image acquisition device that is coupled to a craft, one or more images of one or more scenes in a vicinity of the craft, B. identifying, with a first digital data processor, anomalies in one or more scenes in one or more images generated by the image acquisition device, C. communicating between the first digital data processor and a second digital data processor by way of any of a low-bandwidth and/or small-antenna satellite link, and C. responding, with a second digital data processor that is disposed remotely from the first digital data processor, to signaling from the first digital data processor indicative of an anomaly by generating an image representative of a scene in which the anomaly was detected.

50. The method of claim 49, wherein the image acquisition device is a video camera.

51. A method of operating a digital data processor for use in remote surveillance, the method comprising A. communicating between the digital data processor and a remote craft that has an on-board image acquisition device, wherein such communication is conducted over a low-bandwidth and/or small-antenna satellite communications link, and B. responding to signaling indicative received from the craft of an anomaly in a vicinity thereof by generating an image of scene including a location of that anomaly.

52. The method of claim 51, wherein the image acquisition device is a video camera.

53. A method of operating a digital data processor that is disposed on a surveillance aircraft, comprising A. acquiring, from image acquisition device that is disposed on the aircraft, one or more images of one or more scenes in a vicinity of the craft, B. identifying, utilizing the digital data processor, anomalies in one or more scenes in one or more images generated by the image acquisition device, and C. where the image acquisition device is a video camera.

54. The method of claim 53, wherein step (B) includes executing an SSRX (subspace RX) algorithm on a video image received from the image acquisition device.

* * * * *